United States Patent [19]
Matsumaru et al.

[11] Patent Number: 5,907,460
[45] Date of Patent: May 25, 1999

[54] MAGNETIC HEAD COMPOSED OF A C-SHAPED CORE SECTION AND AN INVERSE L-SHAPED CORE SECTION, AND A MAGNETIC HEAD ASSEMBLY HAVING A PAIR OF THE MAGNETIC HEADS

[75] Inventors: Masahiro Matsumaru, Abiko; Hiroshi Minami, Yokohama, both of Japan

[73] Assignee: Victor Company of Japan, Ltd., Yokohama, Japan

[21] Appl. No.: 08/831,377

[22] Filed: Apr. 1, 1997

[30] Foreign Application Priority Data

Apr. 2, 1996 [JP] Japan ................................ 8-106357

[51] Int. Cl.$^6$ .......................... G11B 5/127; G11B 5/187
[52] U.S. Cl. .................................. 360/125; 360/122
[58] Field of Search ............... 360/84, 122, 125, 360/126

[56] References Cited

U.S. PATENT DOCUMENTS

| | | | |
|---|---|---|---|
| 3,921,219 | 11/1975 | Lalesse ........................... | 360/123 |
| 4,780,780 | 10/1988 | Tanaka et al. ................... | 360/125 |
| 5,148,343 | 9/1992 | Sugawara et al. ............... | 360/122 |
| 5,471,355 | 11/1995 | Ogata et al. ..................... | 360/84 |
| 5,519,556 | 5/1996 | Saito et al. ...................... | 360/125 |
| 5,599,635 | 2/1997 | Katori et al. .................... | 360/125 |
| 5,602,704 | 2/1997 | Gooch et al. .................... | 360/125 |

FOREIGN PATENT DOCUMENTS

| | | | |
|---|---|---|---|
| 59-201210 | 11/1984 | Japan ............................... | 360/125 |
| 62-103811 | 5/1987 | Japan ............................... | 360/125 |
| 62-157311 | 7/1987 | Japan ............................... | 360/125 |
| 1-134709 | 5/1989 | Japan ............................... | 360/125 |
| 5-159210 | 6/1993 | Japan ............................... | 360/125 |

*Primary Examiner*—Jefferson Evans
*Attorney, Agent, or Firm*—Michael N. Meller

[57] ABSTRACT

An improved magnetic head enables to reduce a crosstalk values without degrading head wear characteristic of the magnetic head when it is used as a pair of magnetic heads in a magnetic head assembly. The magnetic head has a first and second core sections, each containing at least a magnetic core. The first and second core sections forms a magnetic gap between the respective magnetic cores and a head-tape contact surface by being abutted at distal end surface thereof. The first core section has an approximately L-shaped configuration. The first core section has a head-tape contact core part for forming a part of the head-tape contact surface of the magnetic head and a straight core part extending in an opposite direction of the head-tape contact surface from the head-tape contact surface. The second core section has an approximately C-shape configuration to allow a winding to be provided around the second core section. Length of the head-tape contact core part is made longer than a length of the straight core part in a tape running direction.

2 Claims, 6 Drawing Sheets

MAGNETIC HEAD COMPOSED OF A C-SHAPED CORE SECTION AND AN INVERSE L-SHAPED CORE SECTION, AND A MAGNETIC HEAD ASSEMBLY HAVING A PAIR OF THE MAGNETIC HEADS

BACKGROUND OF THE INVENTION

1. Field of the Invention

The present invention relates to a magnetic head and a magnetic head assembly used for a high density recording/reproducing apparatus.

2. Description of the Related Art

Recently, in the high density magnetic recording and reproducing apparatus such as a video cassette tape recorder, there has been employed a multichannel system for simultaneously recording and reproducing information signals on and from a magnetic tape, wherein a plurality of magnetic heads are aligned parallel to each other in a tape running direction in a window provided in a rotary drum of the apparatus, and information signals are recorded and reproduced on or from a plurality of tracks on the magnetic tape by the plurality of magnetic heads by rotating the rotary drum together with the plurality of magnetic heads.

Figure 1:
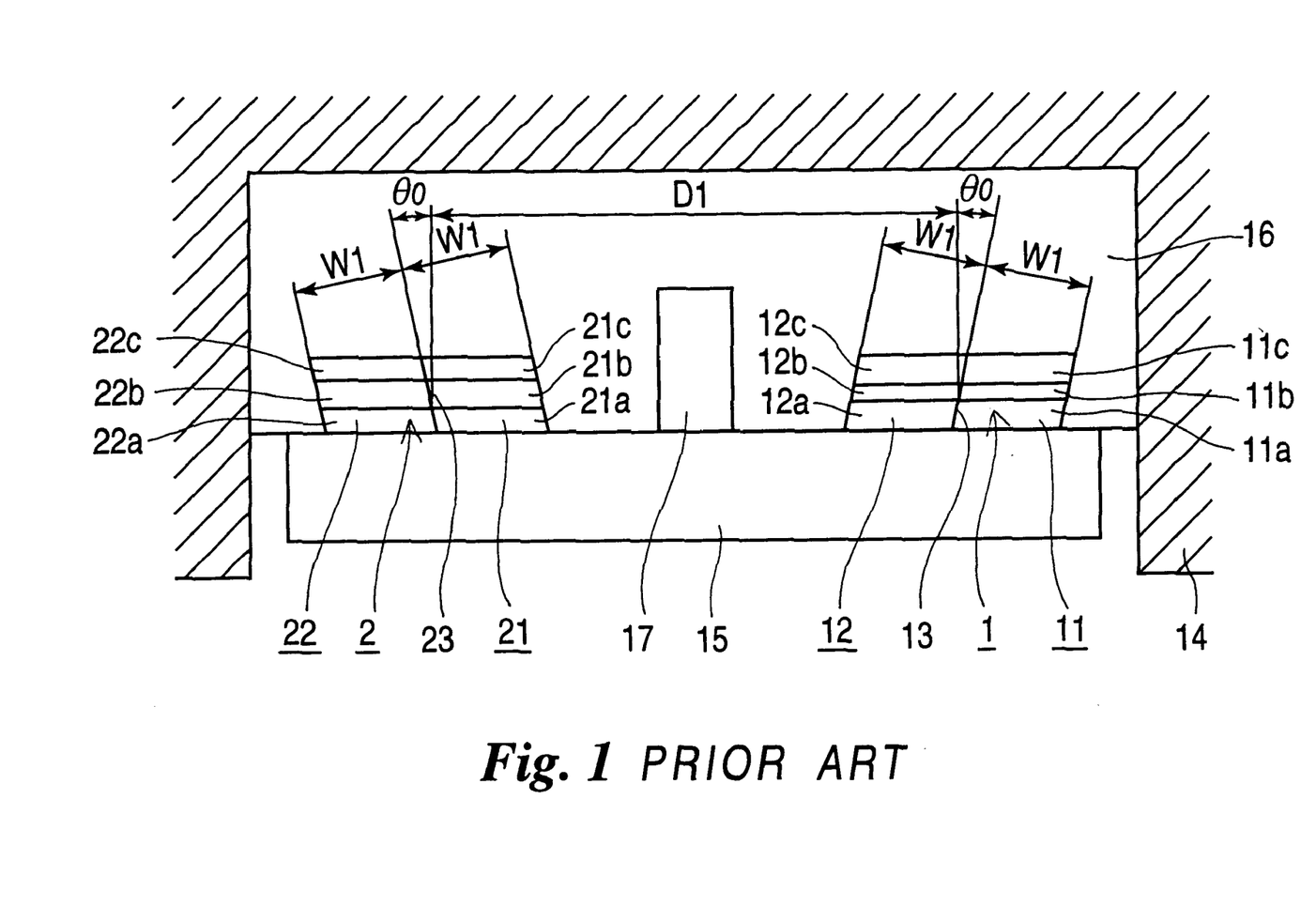
FIG. 1 is a partial front view showing a multichannel magnetic head assembly viewed from a head-tape contact surface side in the prior art.

FIG. 1 is a partial front view showing a multichannel magnetic head assembly viewed from a head-tape contact surface side in the prior art.

Multichannel magnetic head assembly shown in FIG. 1, is employed, for instance, for simultaneously recording and reproducing the information signals on and from a magnetic tape (not shown). As shown in FIG. 1, both a recording magnetic head 1 having a magnetic gap 13 and a reproducing magnetic head 2 having a magnetic gap 23 are aligned parallel to each other on a head base 15 provided in a window 16 of a rotary drum 14 in such a manner that they are remote from each other at an interval D1 between the magnetic gaps 13, 23 thereof so as to allow the magnetic gaps 13, 23 to contact the magnetic tape upon a tape running operation.

Each of the recording and reproducing magnetic heads 1, 2 has a pair of magnetic core sections 11, 12, and 21, 22, and each of the pair of magnetic core sections 11, 12 (21, 22) is comprised of a pair of reinforcing members 12a, 12c (22a, 22c) and a magnetic core 12b (22b) interposed between the pair of reinforcing members 12a, 12c (22a, 22c) in a stacked manner.

The magnetic core section 11 of the recording head 1 has a length W1 which is the same as a length W1 of the magnetic core section 12 thereof, and the magnetic core section 12 of the reproducing head 2 has a length W1 which is the same as a length W1 of the magnetic core section 22 thereof as well.

The magnetic gap 13 of the recording magnetic head 1 is inclined at an angle $\theta_o$ to a line perpendicular to the head base 15 in a clockwise direction, and the magnetic gap 23 of the reproducing magnetic head 2 is inclined at an angle $\theta_o$ in a counterclockwise direction or the opposite direction to the magnetic gap 13.

In the simultaneous recording and reproducing system, there arises a crosstalk problem between the recording and reproducing magnetic heads 1, 2. To suppress a value of the crosstalk below a predetermined value, it is effective to extend the interval D1 between the magnetic gaps 13, 23 of the recording and reproducing magnetic heads 1, 2 or to provide a magnetic shielding member 17 between the recording and reproducing magnetic heads 1, 2.

The interval D1 is usually determined according to an electrical specification. Thus, it may be difficult to extend the interval D1. Even when it is possible to extend the interval D1, a too larger interval D1 causes a problem that the magnetic tape is slackened during the tape running operation. This slack of the magnetic tape prevents the recording and reproducing magnetic heads 1, 2 from securely contacting the magnetic tape, and causes a tape damage in a worst case.

As another countermeasure to suppress the value of crosstalk without extending the interval D1, it is effective to extend a distance between the magnetic core portions 12, 21 which are facing each other, by shortening the lengths W1 of the magnetic core portions 12, 21.

However, to shorten the lengths W1 of the magnetic core portions 12, 21 causes an other problem that a head wear characteristic of the recording and reproducing magnetic heads 1, 2 is degraded because of reduction of the head-tape contact areas thereof.

SUMMARY OF THE INVENTION

Accordingly, a general object of the present invention is to provide a magnetic head and a magnetic head assembly in which the above disadvantages have been eliminated.

A specific object of the present invention is to provide a magnetic head and a magnetic head assembly capable of reducing a value of crosstalk without degrading the head wear characteristics thereof.

Another specific object of the present invention is to provide a magnetic head having first and second core sections, each containing at least a magnetic core, the first and second core sections forming a head-tape contact surface and a magnetic gap on the head-tape contact surface between the magnetic cores of the first and second core sections by being abutted at distal end surfaces which are perpendicular to the head-tape contact surface, of the first and second core sections, the improvement comprising: the first core section having at least a head-tape contact core part and a straight core part, the head-tape contact core part having a first surface for forming a part of the head-tape contact surface of the magnetic head and a second surface perpendicular to the first surface for defining the magnetic gap, the straight core part extending along the second surface of the head-tape contact core part in an opposite direction of the head-tape contact surface; and the second core section defining an recess for allowing a winding to be provided around the second core section, the second core section having a third surface for forming another part of the head-tape contact surface of the magnetic head and a fourth surface perpendicular to the third surface at an open end of the recess to define the magnetic gap abutting on the second surface of the first core section, wherein a length of the head-tape contact core part of the first core section is made longer than a length of the straight core part thereof in a tape running direction.

Another specific object of the present invention is to provide a magnetic head assembly used for a magnetic recording/reproducing apparatus, the magnetic head assembly having at least a magnetic head assembly used for a magnetic recording/reproducing apparatus, the magnetic head assembly having at least a pair of magnetic heads disposed remote from each other on a base, each of the pair of magnetic heads having first and second core sections, each containing at least a magnetic core, the first and second core sections forming a head-tape contact surface and a magnetic gap on the tape contact surface between the magnetic cores of the first and second core sections by being abutted at distal end surfaces which are perpendicular to the head-tape contact surface, of the first and second core sections, the improvement comprising: the first core section having at least a head-tape contact core part and a straight core part, the head-tape contact core part having a first surface for forming a part of the head-tape contact surface of the magnetic head and a second surface perpendicular to the first surface for defining the magnetic gap, the straight core part extending along the second surface of the head-tape contact core part in an opposite direction of the head-tape contact surface; and the second core section defining an recess for allowing a winding to be provided around the second core section, the second core section having a third surface for forming another part of the head-tape contact surface of the magnetic head and a fourth surface perpendicular to the third surface at an open end of the recess to define the magnetic gap abutting on the second surface of the first core section, wherein a length of the head-tape contact core part of the first core section is made longer than a length of the straight core part thereof in a tape running direction.

Other objects and further features of the present invention will be apparent from the following detailed description.

DETAILED DESCRIPTION OF THE PREFERRED EMBODIMENT

Figure 2:
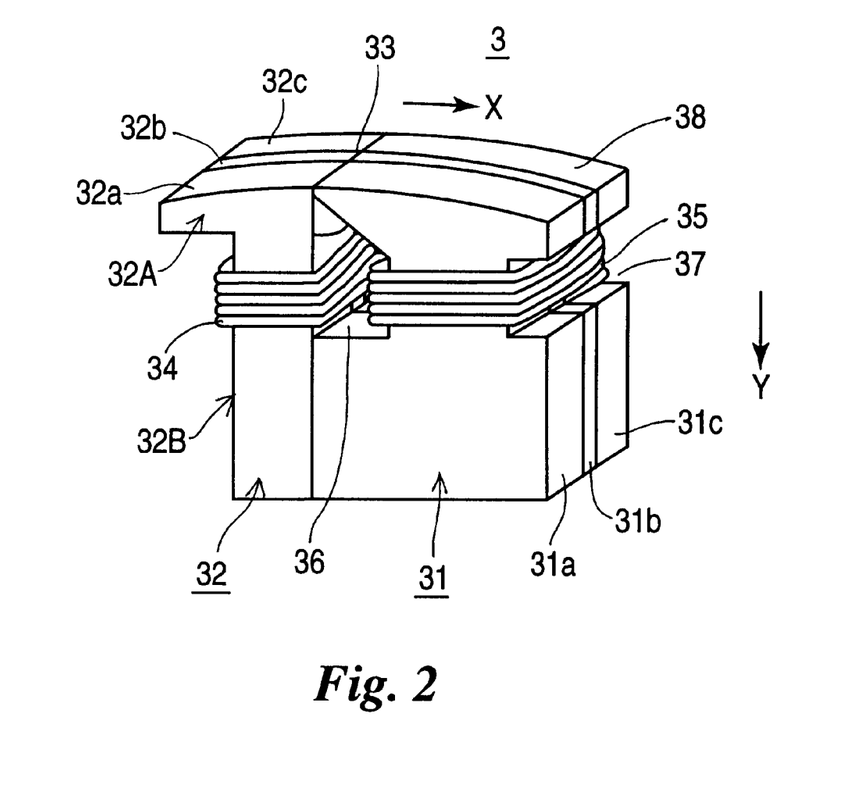
FIG. 2 is a perspective view of an embodiment of a magnetic head of the present invention.
Figure 3:
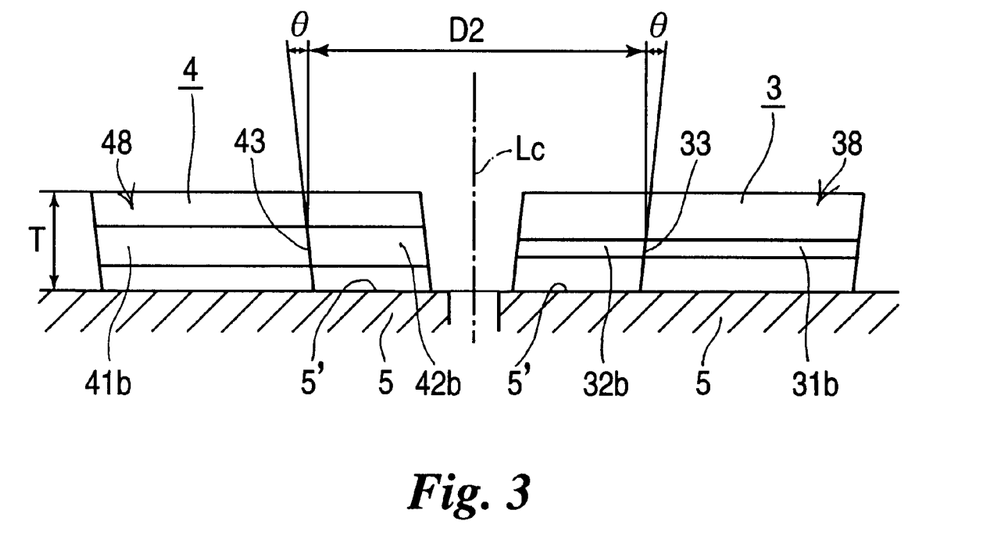
FIG. 3 is a front view of an embodiment of a magnetic head assembly containing a pair of magnetic heads in the present invention viewed from a head-tape contact surface of the pair of magnetic heads.
Figure 4:
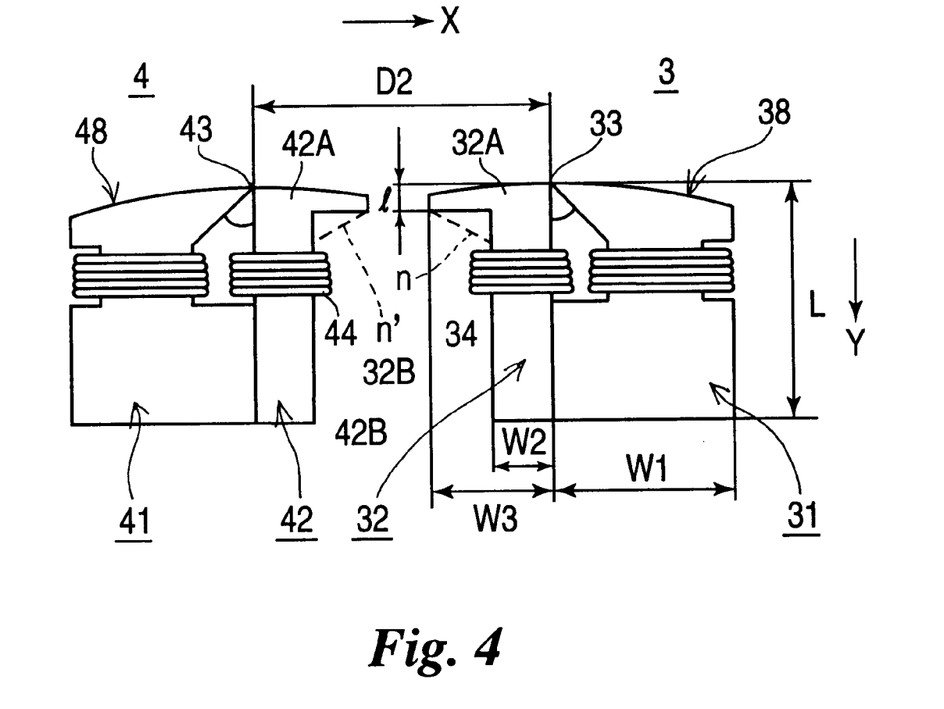
FIG. 4 is a plan view showing the magnetic head assembly viewed from a top of the magnetic head assembly shown in FIG. 3.

Description is given in detail of preferred embodiments of a magnetic head and a magnetic head assembly according to the present invention referred to FIGS. 2 through 4.

Figure 5:
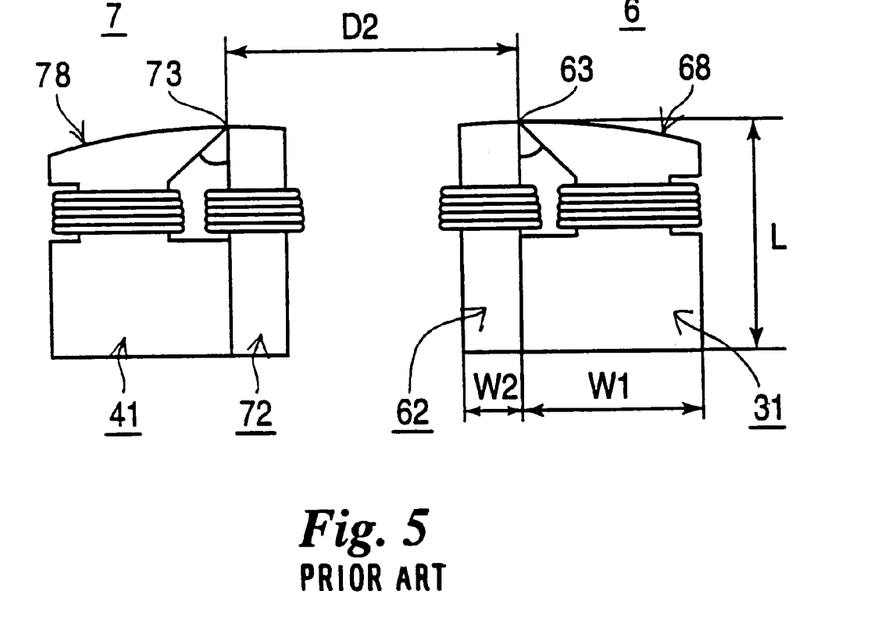
FIG. 5 is a plan view of a magnetic head assembly of a prior art comparative 1.
Figure 6:
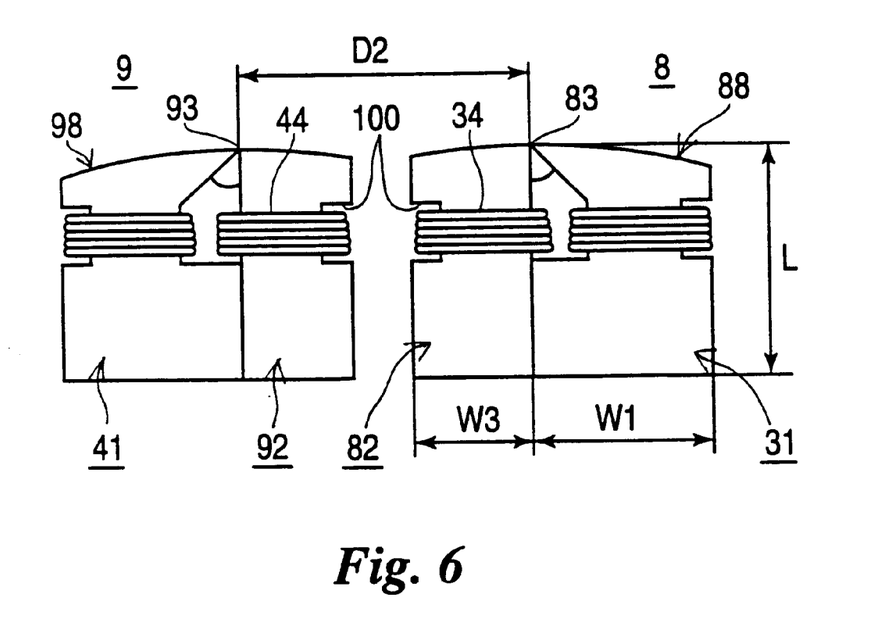
FIG. 6 is a plan view of a magnetic head assembly of a comparative 2.
Figure 7:
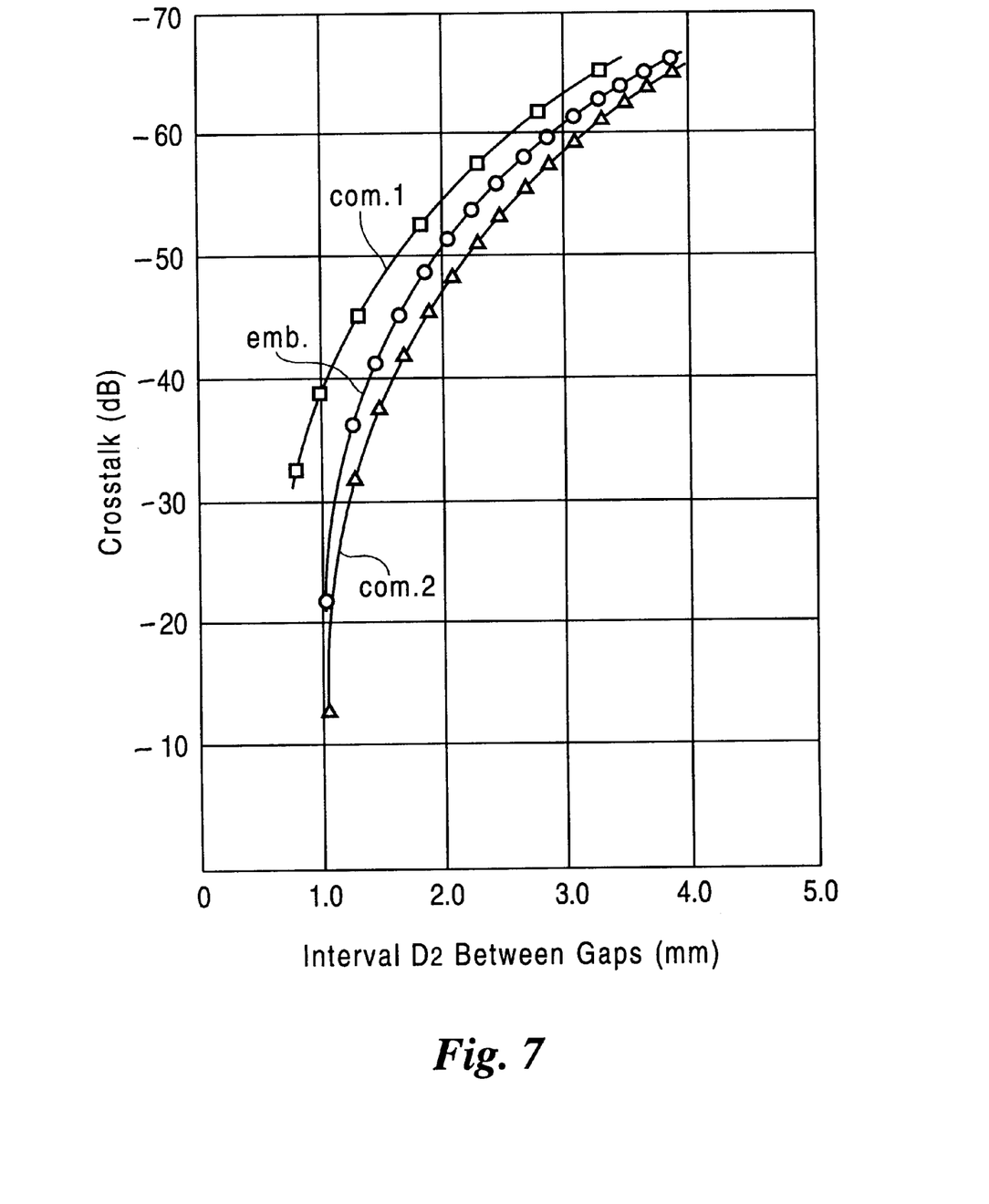
FIG. 7 is a graph showing crosstalk characteristics obtained from the magnetic head assemblies of the embodiment and the comparatives 1 and 2.
Figure 8:
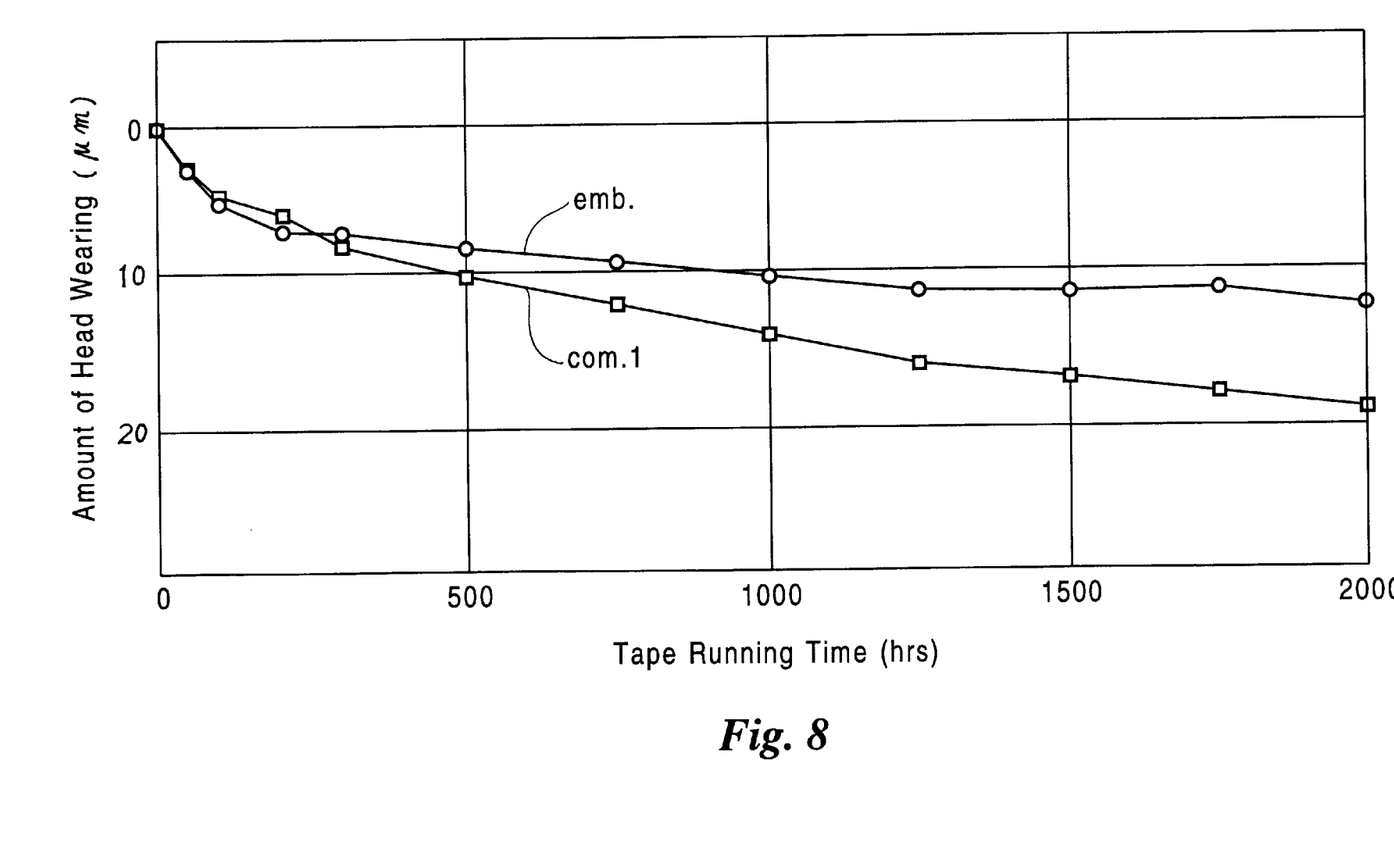
FIG. 8 is a graph showing a relation between an amount of head wear and a tape running time in the respective magnetic head assemblies of the embodiment and the comparatives 1.

Further, comparative examples of magnetic heads and magnetic head assemblies are explained referred to FIGS. 5 and 6, and the crosstalk characteristic and the mechanical strength (head wear characteristic) of the embodiment of the magnetic head assembly are compared to those of the comparatives referred to FIGS. 7 and 8.

Embodiments of a Magnetic Head and a Head Assembly

FIG. 2 is a perspective view of an embodiment of a magnetic head of the present invention;

FIG. 3 is a front view of an embodiment of a magnetic head assembly containing a pair of magnetic head in the present invention viewed from a head-tape contact surface of the magnetic head; and FIG. 4 is a plan view showing the magnetic head assembly viewed from a top of the magnetic head assembly shown in FIG. 3.

As shown in FIG. 2, a magnetic head 3 of the present invention mainly comprises a C-shaped core section 31 having an approximately C-shaped configuration being defined with a recess or a window 36, an inverted L-shaped core section (referred to as L-shaped core section) 32 having an approximately L-shaped configuration, a magnetic gap 33 defined by causing a distal end surface of the C-shaped core section 31 to abut on a distal end surface of the L-shaped core section 32, a first winding 34 wound around the L-shaped core section 32 through the window 36, a second winding 35 wound around the C-shaped core 31 through the window 36 and a winding recess 37 defined on a back surface of the C-shaped core section 31.

The C-shaped core section 31 is comprised of a pair of reinforcing members 31a, 31c and a magnetic core 31b interposed therebetween in a stacked manner. The L-shaped core section 32 is comprised of a pair of reinforcing members 32a, 32c and a magnetic core 32b interposed therebetween in a stacked manner. The magnetic cores 31b, 32b are made of, for instance, Fe—Si—Al alloy, and both of them form a magnetic circuit including the magnetic gap 33 defined on a head-tape contact surface 38 therebetween. The L-shaped core section 32 has a head-tape contact core section 32A and a straight core section 32B extending from the head-tape contact core section 32A in an opposite direction of the tape contact surface 38. Around the straight core section 32B, the winding 34 is provided. As shown in FIG. 4, a length W3 of the head-tape contact core section 32A is made to be larger than a length W2 of the straight core section 32B in a tape running direction shown with an arrow X in FIGS. 2 and 4.

Referring to FIG. 3, a pair of the magnetic heads 3, 4 is fixed on a surface 5' of a head base 5 provided in a window of rotary drum (not shown), resulting in a head assembly of the present invention. The magnetic head 3 of the pair of the magnetic heads 3 and 4 has a magnetic gap 33 inclined at an angle θ to a line perpendicular to the surface 5' of the head base 5 in a clockwise direction.

The other magnetic head 4 of the pair of the magnetic heads 3, 4 is formed symmetrically with respect to the magnetic head 3 except for the thickness of magnetic cores 41b, 42b of which widths are larger than those of the magnetic cores 31b, 32b of the magnetic head 3 and the thickness of the reinforcing members 41a, 41c and 42a, 42c of which widths are smaller than those of the reinforcing members 31a, 31c and 32a, 32c. The magnetic gap 43 of the magnetic head 4 is inclined at an angle θ in a counter-clockwise direction or in an opposite direction to the magnetic gap 33 of the magnetic head 3. But, the magnetic gap 43 may be inclined in the same direction of the magnetic head 3. The pair of the magnetic heads 3, 4 is symmetrically aligned regarding a center line Lc perpendicular to the surface 5' of the head base 5 remote from each other at an interval D2 between the magnetic gaps 33, 43.

In FIG. 4, dimensions of main parts of the magnetic head assembly of the embodiment in the present invention are shown as follows:

a length W1 of the C-shaped core section 31(41) in the tape running direction (X direction): 0.8 mm, a length W2 of the straight core section 32B (42B) of the L-shaped core section 32 (42) in the tape running direction: 0.3 mm, a length W3 of the head-tape contact core section 32A (42A) of the L-shaped core section 32 in the tape running direction: 0.5 mm, and a length "l" of the L-shaped core section 32 (42) in a depth direction shown with an arrow Y: 0.2 mm.

As mentioned above, in the magnetic head assembly of the present invention, the magnetic heads 3, 4 of the pair is aligned in parallel to each other to allow the magnetic gaps 33, 34 to contact the magnetic tape upon the tape running operation in such a manner that the straight core sections 32B, 42B around which the windings 34, 44 are wounded, are confronting to each other. Since the lengths W2 of the straight core sections 32B, 42B are made smaller than the lengths W3 of the head-tape contact core sections 32A, 42A to allow the interval between the straight core sections 32B, 42B to be substantially extended, it is possible to reduce the value of the crosstalk between the magnetic heads 3, 4. In addition, the head wear characteristics of the magnetic heads 3, 4 are not degraded because the tape contact surface areas of the magnetic heads 3, 4 are well maintained not decreased.

Comparative 1

FIG. 5 is a plan view of a magnetic head assembly of a comparative 1.

A pair of magnetic heads 6, 7 of a comparative 1 is aligned on the head base (not shown) provided in the rotary drum (not shown) in the same manner as mentioned in the present embodiment referred to FIG. 3.

Specifically, bodies of the magnetic head 6, 7 are aligned in parallel and remote from each other at an interval D2 between magnetic gaps 63, 73 of the pair of magnetic heads 6, 7, as mentioned in the embodiment in FIG. 3.

The magnetic head 6 of the comparative 1 has the same structure as that of the magnetic head 3 of the present embodiment except for that the L-shaped core section 32 as shown in FIG. 4 is replaced with an I-shaped core section 62 having an I-shaped configuration as shown in FIG. 5.

The I-shaped core section 62 has the same material and thickness as those of the L-shaped core section 32 in FIG. 4. The length W2 of the I-shaped core section 62 in the direction of the tape running direction (X direction) is made to be 0.3 mm which is the same as the length W2 of the straight core section 32B of the L-shaped core section 32 in the present embodiment.

Magnetic head 7 aligned in parallel and remote from the magnetic head 6 at the interval D2 between the magnetic gaps 63, 73 has the same structure as that of the magnetic head 4 of the present embodiment except for that the L-shaped core section 42 shown in FIG. 4 is replaced with an I-shaped core section 72 in the magnetic head 7 as shown in FIG. 5.

The I-shaped core section 72 has the same material and thickness as those of the L-shaped core section 42 in FIG. 4. The length of the I-shaped core section 72 in the direction of the tape running direction (X direction) is made to be 0.3 mm as well.

Comparative 2

FIG. 6 is a plan view of a magnetic head assembly of a comparative 2.

A pair of magnetic heads 8, 9 of the comparative 2 is aligned on the head base (not shown) provided in the rotary drum (not shown) in the same manner as mentioned in FIG. 3.

Specifically, bodies of the magnetic heads 8, 9 are aligned in parallel and remote from each other at the interval D2 between the magnetic gaps 83, 93 thereof as mentioned in the embodiment in FIG. 3.

The magnetic head 8 of the comparative 2 has the same structure as that of the magnetic head 3 of the embodiment except for that the L-shaped core section 32 in the magnetic head 3 shown in FIG. 4 is replaced with an I-shaped core section 82 as shown in FIG. 6.

The I-shaped core section 82 has the same material and thickness as those of the L-shaped core section 32 in FIG. 4. The length W3 of the I-shaped core section 82 in the direction of the tape running direction (X direction) is made to be 0.5 mm which is the same as the length W3 of the head-tape contact core section 32A of the L-shaped core section 32 in the present embodiment.

The other magnetic head 9 aligned in parallel and remote from the magnetic head 8 at the interval D2 between the magnetic gaps 83, 93 has the same structure as that of the magnetic head 4 in the embodiment except for that the L-shaped core section 42 shown in FIG. 4 is replaced with an I-shaped core section 92 in the magnetic head 9 as shown in FIG. 6.

The I-shaped core section 92 has the same material and thickness as those of the L-shaped core section 42 in FIG. 4. The length of the I-shaped core section 92 in the direction of the tape running direction (X direction) is made to be 0.5 mm as well. The I-shaped core sections 82, 92 have respectively a recess 100 for allowing the winding 34, 44 to be wound.

Evaluation Test

FIG. 7 is a graph showing crosstalk characteristics obtained from the magnetic head assemblies of the embodiment and the comparatives 1 and 2; and FIG. 8 is a graph showing a relation between an amount of head wear and a tape running time in the respective magnetic head assemblies of the present embodiment and the comparatives 1.

The respective magnetic head assemblies of the present embodiment and the comparatives 1, 2 are evaluated by measuring a crosstalk characteristic and an amount of head wear of the respective magnetic head assemblies.

The crosstalk characteristic is measured under a condition that a sinusoidal wave signal of 25 MHz is applied to, for instance, the magnetic heads 3 by changing an interval D2 between the magnetic gaps 33, 43, and an output signal induced from the winding of the magnetic heads 4 is defined as a crosstalk value of the magnetic head assembly in the present embodiment.

The results of the crosstalk characteristics of the embodiment and the comparatives 1, 2 are shown in FIG. 7, wherein a reference character "emb." denotes the crosstalk of the embodiment of the present invention, "com. 1" that of the comparative 1 and "com. 2" that of comparative 2.

Referring to FIG. 7, when the interval D2 between the magnetic gaps 33, 43 of the magnetic heads 3, 4 in the embodiment is made to be 1.4 mm, a value of the crosstalk of the magnetic head assembly of the embodiment is −40 dB. Under the same condition as mentioned above, a value of the crosstalk of the comparative 1 is −45 dB and a value of the crosstalk of the comparative 2 is −36 dB. The acceptable value of the crosstalk is determined as not more than than −40 dB in the specification.

Incidentally, it has been confirmed that even when shapes of the L-shaped core sections 32, 42 in the present embodiment are changed into ones as shown with dotted lines n, n', the value of the crosstalk characteristic of the head assembly in the present embodiment shows approximately the same as that of the original one mentioned above.

The head wearing test is conducted on the respective magnetic head assemblies of the present embodiment and the comparative 1 except for comparative 2 because it has the same head-tape contact surface configuration as that of the present embodiment. Conditions of the head wearing test are as follows:

rotational speed of the rotary drum: 4500 rpm head-tape relative speed: 14.5 m/sec temperature/humidity: 20° C./65%, and running time: 2000 hours Amount of head wear of the respective magnetic head assemblies is obtained by measuring a protruding amount of the magnetic head from a surface of the rotary drum.

The results of the head wearing test are shown in FIG. 8, wherein a reference character "emb." denotes a head wear characteristic curve of the embodiment and "com.1" that of the comparative 1.

Referring to FIG. 8, a degree of head wear of the magnetic heads 3, 4 in the present embodiment after the tape running of 2000 hour, is as small as about 70% of a degree of head wear of the magnetic heads 5, 6 of the comparative 1. Thus, it is confirmed that the magnetic heads 3, 4 of the present invention is excellent in the head wear characteristic compared to the magnetic heads 6, 7 of the comparative 1.

As far as the magnetic head assembly is concerned, a pair of magnetic heads is employed, however, it is possible to employ plural magnetic heads of not less than three units.

Further, as far as the magnetic head is concerned, the L- and C-core sections of the magnetic head have the magnetic core of Fe—Si—Al material in a stacked manner, however, the magnetic head of the present invention is not limited by only the material and the construction mentioned above. Needless to say, other materials and constructions can be applied to the magnetic head of the present invention.

According to the magnetic head of the present invention, the magnetic head has a first and second core sections, and the first core section has an approximately L-shaped configuration, and the second core section has an apprixi­mately C-shaped configuration. The first core section has at least a head-tape contact core part for forming a part of the head-tape contact surface of the magnetic head and a straight core part for providing a winding, wherein a length of the head-tape contact core part is made to be longer than a length of the straight core part in a tape running direction. Thus, it is possible to suppress the value of crosstalk of the magnetic head without a degradation of the head wear characteristic of the magnetic head when it is used as a head assembly in which a pair of the magnetic heads is disposed in parallel on a head base in such a manner that the first core sections of the respective pair of magnetic heads are confronting to each other.

What is claimed is:

1. A magnetic head assembly used for a magnetic recording/reproducing apparatus to simultaneously record and reproduce information signals on and from a magnetic tape, the magnetic head assembly having at least a pair of magnetic heads with each having a magnetic gap and with the pair of magnetic heads disposed together in parallel on a base so that the magnetic gaps are remote from each other at a certain length in a tape running direction with each of the pair magnetic heads comprising:

a first magnetic core section having a first winding and a second magnetic core section having a second winding with the first magnetic core section in contact with the second magnetic core section to form a magnetic gap and a head-tape contact surface;

said first magnetic core section having a substantially C-shaped configuration with a recess for providing the first winding on a first flat surface in a direction parallel to the tape running direction to allow the magnetic gap to be formed in a depth direction thereof, and has a first head-tape contact part of a length W1 in the tape running direction;

said second magnetic core section having an inverse L-shaped configuration, a second head-tape contact part of a length W3 and a straight core section extending downward from a distal end of the second head-tape contact part, the straight core section having a length W2 in the tape running direction, with said second winding wound around said straight core section, and a second flat surface so that the magnetic gap extends from the second head-tape contact to the recess in the first magnetic core section;

wherein a relation is formed among the lengths of W1, W2 and W3 represented by an inequality of W1>W3>W2, and the pair of magnetic heads is aligned in parallel together on the base in such a manner that the inverse L-shaped core sections of the pair of magnetic heads confront each other.

2. A magnetic head assembly as claimed in claim 1, wherein a ratio of the length of W2 to the length of W3 is approximately determined to be 0.6.

\* \* \* \* \*